(12) United States Patent
Sayers et al.

(10) Patent No.: US 8,548,280 B2
(45) Date of Patent: Oct. 1, 2013

(54) SYSTEMS AND METHODS FOR REPLACING NON-IMAGE TEXT

(75) Inventors: Craig P. Sayers, Menlo Park, CA (US); Prakash Reddy, Fremont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 320 days.

(21) Appl. No.: 13/026,928

(22) Filed: Feb. 14, 2011

(65) Prior Publication Data

US 2012/0207390 A1   Aug. 16, 2012

(51) Int. Cl.
*G06K 7/10* (2006.01)

(52) U.S. Cl.
USPC .......................................................... 382/321

(58) Field of Classification Search
USPC .......................................................... 382/321
See application file for complete search history.

(56) References Cited

U.S. PATENT DOCUMENTS

| | | | | |
|---|---|---|---|---|
| 6,903,751 | B2 * | 6/2005 | Saund et al. | 345/619 |
| 7,970,213 | B1 * | 6/2011 | Ruzon et al. | 382/229 |
| 8,331,739 | B1 * | 12/2012 | Abdulkader et al. | 382/311 |
| 2003/0142112 | A1 * | 7/2003 | Saund et al. | 345/619 |
| 2005/0060273 | A1 * | 3/2005 | Andersen et al. | 707/1 |
| 2008/0219543 | A1 | 9/2008 | Csulits et al. | |
| 2009/0164881 | A1 | 6/2009 | Segarra et al. | |

OTHER PUBLICATIONS

Machine Learning for Reading Order Detection—Understanding, Malerba et al., Springer, 2008, pp. 1-25.*
Unknown., "The Documentation Track", Retrieved from http://www.clir.org/pubs/reports/pub83/doctrack.html, 7 pages, Feb. 11, 2011.
Unknown., "Proofreading", Retrieved from http://community.nuance.com/wikis/omnipage/proofreading.aspx, 3 pages, Feb. 11, 2011.
Vysokos, Thomas., "How to Count Word Statistic in an Image File for Free", Retrieved from http://www.anycount.com/WordCountBlog/2009/07/10/how-to-count-word-statistic-in-an-image-file-for-free/, Published: Jul. 10, 2009, 7 pages.
Reddy, Prakash., "Replacing Word with Image of Word", U.S. Appl. No. 12/916,530, filed Oct. 30, 2010, 18 pages.

* cited by examiner

*Primary Examiner* — Jayesh A Patel (57) ABSTRACT

Systems and methods for replacing non-image text are provided. One method for replacing non-image text includes padding a first data representing an image of text to create an image segment. The method includes replacing a second data representing non-image text with the image segment.

15 Claims, 5 Drawing Sheets

SYSTEMS AND METHODS FOR REPLACING NON-IMAGE TEXT

BACKGROUND

Text is frequently received electronically in a non-textually editable format. For instance, image data may be generated by scanning a hardcopy (e.g., a paper copy) of the text using a scanning device. The image data representing the text is not textually editable because the data represents an image of the text as opposed to representing electronic text. An image data cannot be edited using a text editing computer program nor can an image of the text be searched, for example, by a word processing computer program. To convert image data to textually editable electronic text, optical character recognition (OCR) may be performed on the image. Performing OCR on image data generates electronic non-image text. The non-image text represents the image data in a textually editable form, which allows the data to be operated on in a number of ways. For example, non-image text can be edited or searched.

DETAILED DESCRIPTION

Systems and methods for replacing non-image text are provided. One method for replacing non-image text includes padding a first data representing an image of text to create an image segment. The method includes replacing a second data representing non-image text with the image segment.

In the following detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

The figures herein follow a numbering convention in which the first digit or digits correspond to the drawing figure number and the remaining digits identify an element or component in the drawing. Similar elements or components between different figures may be identified by the use of similar digits. For example, 102 may reference element "02" in FIG. 1, and a similar element may be referenced as 302 in FIG. 3. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

Figure 1:
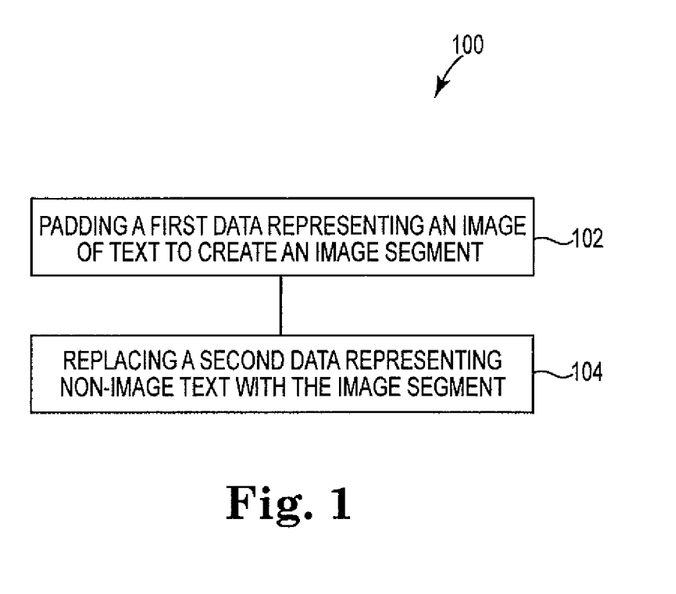
FIG. 1 is a flow chart illustrating an example of a method for replacing non-image text.

FIG. 1 is a flow chart illustrating an example of a method 100 for replacing non-image text. As will be explained in more detail below, a method 100 of replacing non-image text includes padding a first data representing an image of text to create an image segment as shown at block 102. As shown the method 100 includes replacing a second data representing non-image text with the image segment at block 104.

Performing OCR on image data generates electronic non-image text in a textually editable form. Even with sophisticated OCR techniques, the non-image text generated to represent the image data may not be the same non-image text each time, depending on the OCR mechanism, the image quality, and/or other factors. In one example, an OCR mechanism can perform OCR on a portion of image data and may assign a confidence score to the portion of non-image text associated with the image data. An OCR mechanism can be made up of multiple OCR engines, with each engine generating electronic non-image text in a textually editable format. The non-image text can represent text, words, and/or numerals, among others. In some cases, the OCR engine may provide non-image text with an indication that the OCR engine has a low degree of confidence that the non-image text accurately represents the image. A confidence threshold can be selected such that when a confidence score falls below the confidence threshold instructions can be executed to identify that text as uncertain. Text can be used to represent, for example, individual characters (e.g., "a", "b", "c"), words, numbers (e.g., "1", "2"), and/or symbols, among others.

The methods and systems of the present disclosure can operate on an electronic device, e.g., an e-reader. Examples of electronic devices include, a computer, a web platform, and/or a discrete computing device (e.g., Kindle, i-Pad, etc), among others. For ease of reference and readability, the term "e-reader" will be used herein to refer to the broad category of electronic devices suitable for implementing examples of the present disclosure.

The definition of "word" can be one or more characters between a leading space or a leading punctuation mark, and a lagging space or a lagging punctuation mark. Examples of punctuation marks include periods, commas, semi-colons, colons, and so on. As such, a word can include non-letter characters, such as numbers, as well as other non-letter characters, such as various symbols. Furthermore, a hyphenated word (e.g., a word containing a hyphen) can be considered as a whole, including both parts of the word, to either side of the hyphen, or each part of the word may be considered individually. For example, the word "post-graduate" may be an adjective that modifies a subsequent word "degree." This word may be considered as two words, "post" and "graduate" or it may be considered as one word, "post-graduate."

Non-image text that may be the result of optical character recognition can be replaced by the image data representing the non-image text. In one example, non-image text identified as uncertain text can be replaced with an image. Instructions can be executed to select the portion of image data associated with the uncertain text from a first data set. Instructions can be executed to extract the image data to include the text of the image. In another example, instructions are executed to extract the text of the image and a perimeter of space at a set width beyond the text. When the image data is extracted to include the text only or the text and a defined perimeter and replaces the non-image text, the text of the replacement image can be misaligned with the non-image text preceding and following the replacement image. This misalignment may be perceived by a user reading a presentation of the text and cause an unwanted distraction. Some example of misalignment can include the image appearing higher or lower than other words represented in the same line of text, among others.

Figure 2A:
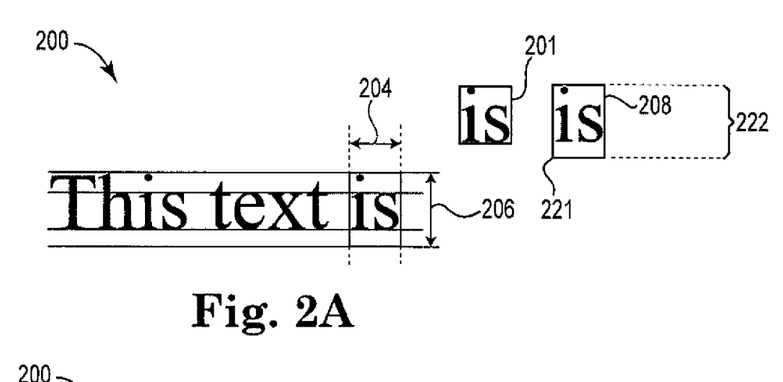
FIGS. 2A and 2B illustrate an example of padding the size of an image to create an image segment.
Figure 2B:
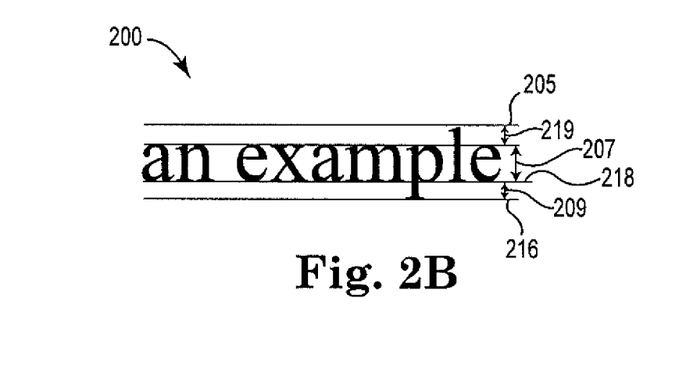

FIGS. 2A and 2B illustrate an example of padding the size of an image to create an image segment. In an example 200 of the present disclosure, the image selected to replace the non-image text is padded to create an image segment. The image segment replaces the non-image text. For example, the image "is" 201 may be selected to replace non-image text. In describing the design characteristics of font, some common design terminology can be used. For example, the baseline 218 is the line to which the characters of text are aligned. The x-height 207 can refer to the distance between the baseline 218 and the height of a lowercase 'x'. The total height of the font, 206, includes space for characters with ascenders, descenders, uppercase letters, and accented characters. Examples of ascending characters include "k", "h", "b", among others. Examples of descending characters include, "j", "g", "q", among others. Examples of uppercase letters include, "D", "R", "M", among others. Examples of accented characters include, "é", "ó", among others. In an example, the text "is" 201 has no descending characters of text and the upper portion of the dot above the "i" may be lower than the total height of the font 206. The area beyond the text characters refers to the space surrounding the text or portion of text (e.g., word). The image "is" 201 may be cut out from the image data by finding the minimal bounding box to encompass all the pixels in the text of "is" 201. The image "is" 201 may also be cut so that the top and bottom borders of the text include a predetermined perimeter of space.

In an example, the image segment "is" 208 has been padded to include space above and below the text such that the height of the padded image (e.g., image segment 208) matches the total height of the font 206 and so that the baseline 218 is aligned with surrounding words on the same line of text. Referring to FIG. 2B, the distance from the baseline 218 to the bottom of the font 216 can be determined by measuring the distance of the descending character. The distance from the baseline 218 to the top of the font 205 can be determined by measuring words with capital letters. The total height of the font 206 can be determined by adding the distance below the baseline 209 and the distance above the baseline 219 and the x-height 207. Because of the text of the image, image "is" 201 is known to sit on the baseline 219. The image "is" 201 is padded below the text of the image to make the baseline of the image segment 221 consistent with the baseline 219 on which the line of text sits. Space is added above the text of the image to make the total height of the image segment 222 consistent with the total height of the font 206. The image segment 208 results from padding the image "is" 201.

The presence or absence of ascending and descending characters affects the degree to which the image (e.g., image 201) will be padded to create an image segment (e.g., image segment 208). Padding of the image (e.g., image 201) is performed so that the image segment (e.g., image segment 208) can replace non-image text in a way that makes the image segment appear similar. Based on the alignment of the image segment with the surrounding non-image text, the user may not perceive the image segment as different from the surrounding text.

Figure 3:
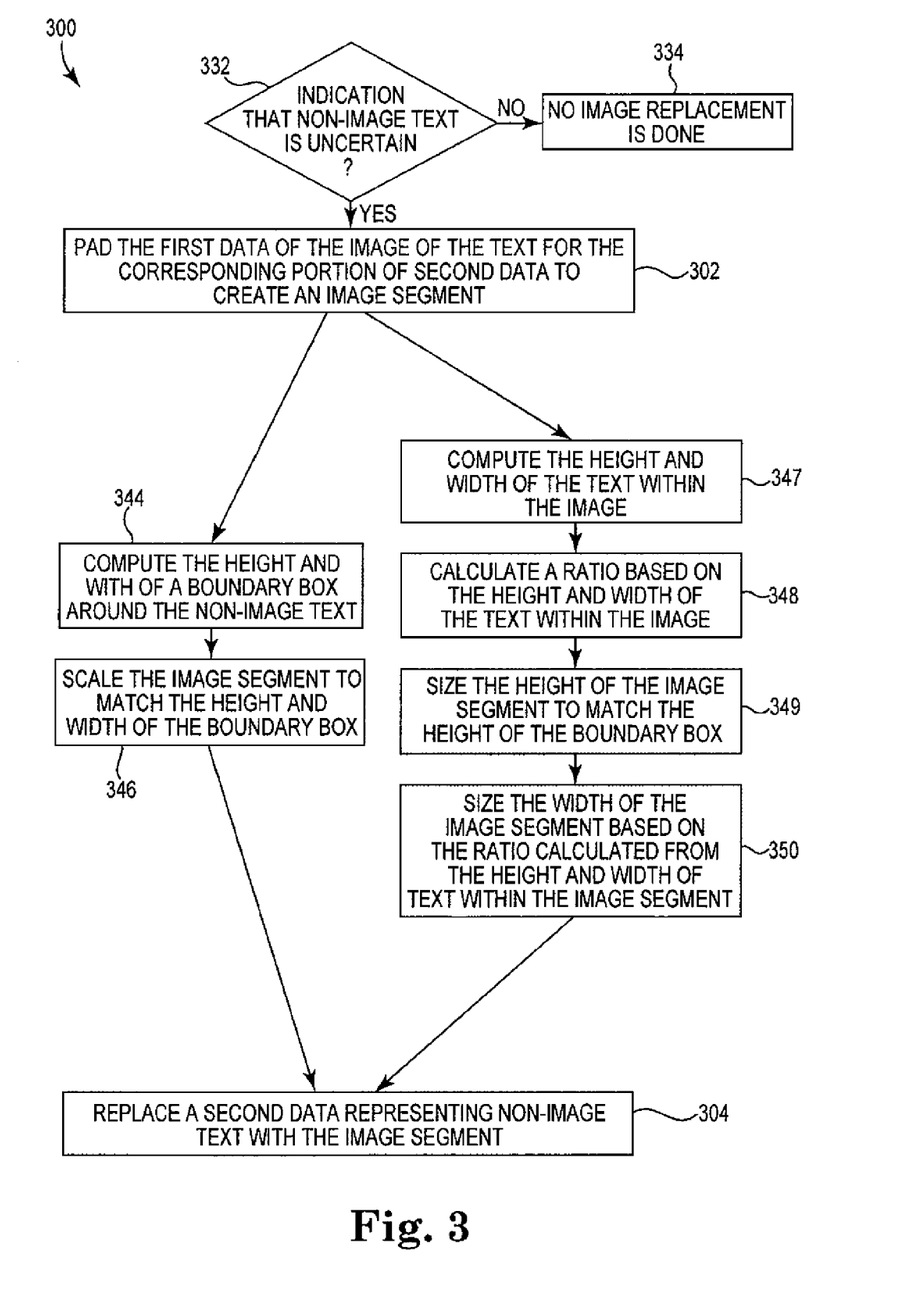
FIG. 3 is a flow chart illustrating an example of a method for replacing non-image text.

FIG. 3 is a flow chart illustrating an example of a method 300 for replacing non-image text. In an example, instructions are stored on a non-transitory computer-readable medium and the instructions are executable by a processor to indicate that a portion of non-image text is uncertain. If there is no indication that the non-image text is uncertain 332, then no image replacement is done 334. Non-image text with no indication that the text is uncertain can be considered good text. If there is an indication that a portion of the non-image text is uncertain, then instructions may be executed to pad the first data of the image of the text for the corresponding portion of second data to create an image segment 302. In preparation to replace the portion of non-image text with the image segment, instructions may be executed to compute the height and width of a boundary box around the non-image text 344. The boundary box has width equal to the width of the non-image text and height equal to the total height of the font used to display the non-image text. In an example, instructions may be executed to scale the image segment to match the height and width of the boundary box 346 and instructions may be executed to replace a second data representing non-image text with the image segment 304. Matching the height and width of the boundary box with the image segment allows the text of the image to appear like the surrounding non-image text.

Instructions can be executed to survey non-image text throughout the document to determine font statistics. Font statistics can be determined by computing the width and height for each image corresponding to the non-image text and averaging across several occurrences. The font statistics may include, for example, the x-height, the farthest distance below the baseline, the highest height above the baseline, and total height for each type of font used in the document. The survey can also refer to taking a random sampling of characters of a certain font variant within a page, for example, italic font or bold font, among others. The survey can also include looking at multiple instances of a word up to and including the entire document, for example, "the" to calculate the height and width of the boundary box for the non-image text of "the". If the type of font used in the document is known, or if the type of font can be determined by measuring letterforms, then known statistics from the type of font can be used without the need to examine a large number of images in the document. For example, if the type of font is known and the character "g" is known to have a descender which extends the farthest distance below the baseline, then to determine the distance from the baseline to the bottom of the font to pad an image, instructions can be executed to measure a word containing a "g".

When viewing a presentation of text in an e-reader, the flow of the text contributes to the viewing experience. The "flow" refers to the words being placed adjacent to each other along a baseline, and for the words on each line which do not fit within the visible boundary to fall to a next line. The text is easy to read when all the words have a consistent appearance, size, vertical alignment, and when none extend off the edge of the screen. When a user "hovers" over an image, this can refer to the user placing a cursor over a portion of text. This can be done, for example, by using a hand-operated device (e.g., a computer mouse, or track ball, etc.), and/or using a touch screen, among others.

The non-image text generated by performing OCR may result in "best-guess text". In an example, the height of the font used to present the "best-guess text" can be used to set the height of the boundary box. Uncertain non-image text may include some characters dissimilar from the characters included in the image. Even so, by matching the height and width of the boundary box around the non-image text, the image segment, and thereby the image of text within the image segment, rests on the page. A user viewing the text of the image may not perceive that the image differs in any way from the surrounding non-image text. For instance, when a user changes the size of font for viewing the document, the image of text within the image segment can scale larger and smaller in proportion with the non-image text. In this way, the image flows with the surrounding non-image text with changes in size. The flow of the non-image text and images can appear smooth and fluid to the user. The user may not perceive the images throughout the document. In an example, if the "best-guess text" is presented as "your", the boundary box for the image segment "your" can be properly determined.

Figure 5:
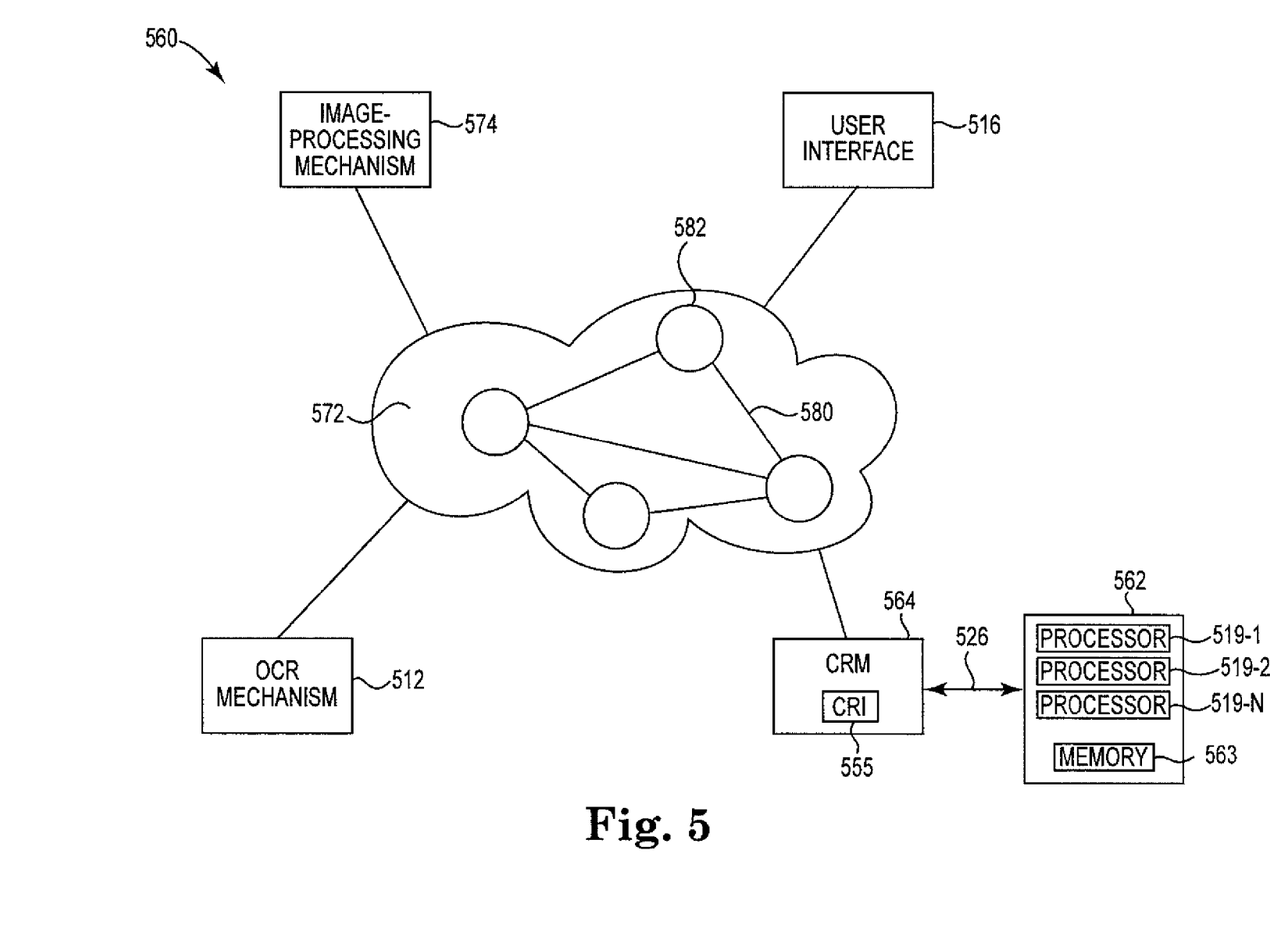
FIG. 5 illustrates an example of a system for replacing non-image text.

The font statistics may be stored in the computer-readable medium of the present disclosure (e.g., CRM 564 illustrated in FIG. 5). The e-reader can modify the font displayed to more closely match the font of the original document based on the font statistics (e.g., the font of the document scanned to create the image data) so that the text of image segment appears similar to the surrounding words. If the font displayed differs from the font of the original document, the e-reader may adjust the vertical position of the image segment so that the baseline of the image segment (e.g., 221 in FIG. 2B) aligns with the baseline of the font (e.g., 219 in FIG. 2B) used in the e-reader. The degree of the adjustment can be calculated by comparing the distance below the baseline (e.g., 216 in FIG. 2B) for the e-reader font, with the distance below the baseline for the font in the original document.

In the case where the distance below the baseline is not known for one or both of the e-reader font and the font of the original document, then an estimated value may be used. For example, the default font for many e-readers extends below the baseline (e.g., 219 in FIG. 2B) by an amount equal to X % of the total font size (e.g., 206 in FIG. 2A). The type of fonts used in the documents being processed may be, in many cases, Serif fonts with a depth of Y % of the total font size. As a result, when the e-reader displays those documents, the image segments can be raised (X %–Y %) of the total font size to align the baseline of the text (e.g. 219 in FIG. 2B) and the baseline of the image segment(s) (e.g., 221 in FIG. 2B).

The user can select the font used by an e-reader to electronically present the non-image text representing the document. In an example, based on the font of the image, instructions can be executed to recommend to the user a font for viewing the document such that the text metrics of the non-image text are similar to the metrics of the text within the image, and thereby within the image segment.

In some examples, the portion of non-image text indicated as uncertain can include two or more adjacent words. Instructions can be executed to separate the two or more adjacent words and create an image segment for each of the words of the non-image text, resulting in multiple image segments. The image segments replace the non-image text words in the order the non-image text words appeared. The image segments may be adjacent to one other, and the image segments may flow as the non-image text. For instance, one image segment created to replace one of the two or more adjacent words can be presented on one line of text, while another segment created to replace another word of the two or more adjacent words can be presented on another line of text. In this way the image segments flow with the non-image text in such a way that the user may not perceive the image segments as different in any way from the non-image text.

When the user hovers the mouse over the image of text within an image segment, a user viewing the text can see the non-text image the same size as the image. The user can also be presented with the OCR best-guess represented by the non-image text, which the image segment replaced. The best-guess can refer to the non-image text generated by the OCR mechanism that most accurately represents the image based on criteria set by the OCR mechanism. Similarly, for instance, the second best-guess can correspond to the second most accurate non-image text that represents the image as evaluated by the OCR mechanism, and the third best-guess can correspond to the third most accurate non-image text that represents the image as evaluated by the OCR mechanism. In an example, the user can be presented with the OCR best-guess, the OCR second best-guess, and the OCR third best-guess, among others when the user hovers over an image segment.

In an example, instructions may be executed to compute the height and width of the text within the image 347. Instructions may be executed to calculate a ratio based on the height and width of the text within the image 348. Instructions may be executed to scale the image segment so that the height of the image segment matches the height of the boundary box 349 computed around the non-image text. "Em" units are units defined relative to the total height of a style of font. Examples of style of font include, Serif, Arial, and/or Times New Roman, among others. For example, in some e-readers scaling the image segment can be done by specifying the height of the boundary box using "em" units. Instructions may be executed to size the width of the image segment based on the ratio calculated from the height and width of the text within the image segment 350. In an example, scaling the image can be done by specifying that image segment be adjusted the same amount in the height and width directions when adjusting the height of the boundary box. In this case, the ability for the user to hover over the image and see the non-image text as the same size is lost. The image segment can still flow with the text on the page, and for some users the ability of the image segment to flow with the surrounding text can be desirable.

In an example, instructions can be executed to allow the image replacing the non-image text to be edited. This can be done by presenting the image and non-image text to a user in an editing field. The user can enter user-provided non-image text. The user may hover over the image segment and concur, or disagree, that the text of the image appears correct within the context of the surrounding text. In an editing field, the user can enter the characters of text that represent the correct text into the field. The user-provided non-image text can replace the image segment. The user-provided text can be textually editable allowing the text to be edited and searched, among other things. Instructions can be executed to identify other similar occurrences of either the same non-image text or a similar image couple with non-image text. For example, an image of the text "Heidelburg" may in one place have an OCR mechanism best-guess text of "Heldelburg" and in another "Heide1burg". As here, when the differences in the non-image text is small and the differences in the images associated with each non-image text is small, the two occurrences can be considered similar occurrences. For each similar occurrence, a confidence rating can be calculated to determine that the same user-provided text can be used to replace the similar occurrences. The confidence rating can be based on a number of factors, including the differences between the non-image text, the differences between the images, and the OCR engine confidence that the user-provided text matches the text of each image. For occurrences with a high confidence rating, the image segments associated with the other similar occurrences of the same non-image text can be automatically replaced with the user-provided non-image text. For occurrences with a low confidence rating, the user-provided text can be suggested to the user for approval and/or offered as an option in an editing field. To reduce the time required for correction, image segments associated with similar occurrences of the same non-image text throughout the document may be presented to the user in a list so that the user can accept or reject the similar occurrences without having to locate or navigate to every similar occurrence.

In an example, the user-provided text can be added to the OCR engine dictionary and the OCR mechanism can then be re-applied to the images, allowing the OCR mechanism to correctly identify a greater number of portions of image data. An expanded OCR engine dictionary may also reduce the number of portions of uncertain text when processing other similar documents, for example, books by the same author, books about similar subjects, and/or books printed by the same company, among others The user-provided text can be marked to indicate that non-image text presented to the user is user-provided, rather than OCR generated non-image text. Information about the image associated with the user-provided text can be retained. The user-provided non-image text may be considered partially-corrected text. Instructions can be executed to store information about the user, the user-provided non-image text, and the image. The stored information can be promulgated with a number of additional users. The user-provided non-image text entered by the user to replace the image segment can be promulgated to a number of additional users within the system. An example of system 560 is described in detail in relation to FIG. 5. In another example, the replacement can be a temporary change that is applied only to the user who provided the user-provided non-image text. The decision of whether to promulgate the replacement of the image segment can be based on a credibility score assigned to the user-provided non-image text. The credibility score can be based on a number of factors, those factors can be equally weighted or weighted based on the assignment of non-equal numbers to represent the degree of contribution of one of the factors of the credibility score. Examples of factors used in determining a credibility score can include, but are not limited to, the magnitude of the differences between the OCR mechanism "best-guess text" and the user-provided text, the confidence rating that the user-provided text matches the image, the number of image segments for which the user has provided replacement non-image text, the number of replacements that have been confirmed by other users, how long the user has been a member of a community of users, among other things. Based on the information collected and stored with user-provided text, the text may be considered fully-corrected text, in which case the user-provided text may be provided to a number of users, rather than the image segment. As discussed below, the user-provided text can be marked to indicate the non-image text was user provided, as opposed to electronically generated by an OCR mechanism, for example.

Figure 4:
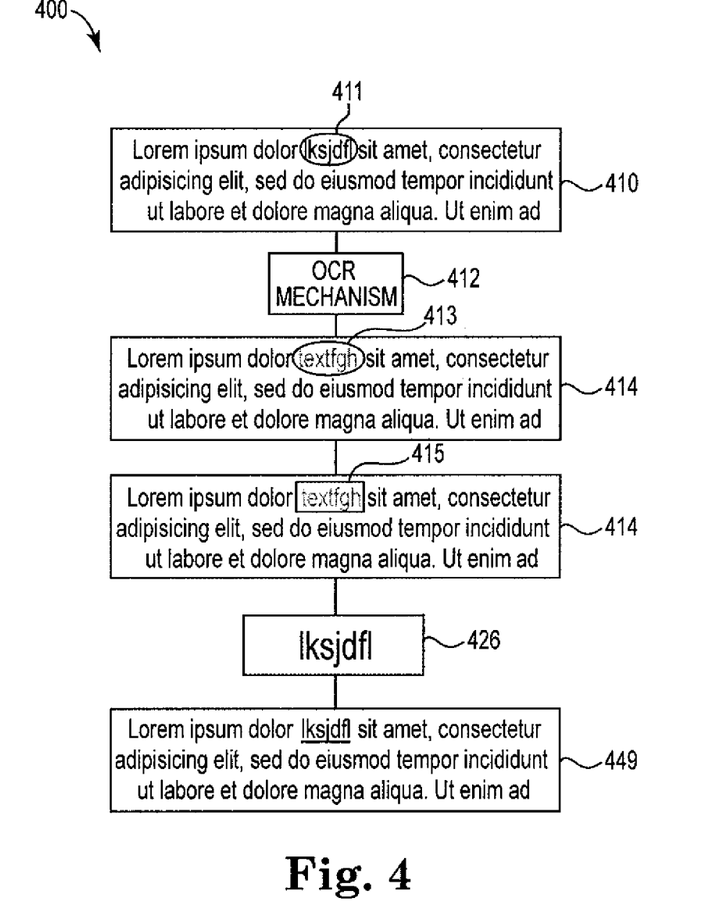
FIG. 4 illustrates an example of a method for replacing non-image text.

FIG. 4 illustrates an example of a method for replacing non-image text. The method 400 for replacing non-image text can include generating an image of text 410, for example, by scanning a copy of a document. Examples of a document used herein, can include a book, or a journal, or a letter, among others. The image of text 410 can be converted by the OCR mechanism 412 to non-image text 414. The non-image text 414 generated by the OCR mechanism may include uncertain text 413. Uncertain text 413 can refer to, for example, non-image text including an indication that the OCR mechanism has a low degree of confidence that the uncertain text 413 accurately represents the text within a portion of the image 411. Instructions can be executed to compute a boundary box 415 around the non-image text 413 (e.g., uncertain text). An image segment 426 can be created by padding a portion of the image 411 associated with the portion of non-image text 413 (e.g., uncertain text). The image segment 426 can replace the portion of non-image text 413 (e.g., uncertain text). In the resulting presentation of text 449, the image segment 426 is presented with the surrounding non-image text. In an example, a portion of the image segment 426 can be marked so that that image text of the image segment is presented to the user as visually distinct from the surrounding text. In an example, the user may not have any visible indication that the image segment is anything other than OCR generated non-image. When the user hovers over the image segment 426 the non-image text 413 (e.g. uncertain text) replaced by the image segment 426 can be presented. The user can replace the image segment 426 with user-provided text where the user-provided text represents user-provided non-image text.

Portions of non-image text identified as uncertain text can be presented to the user through various arrangements. The uncertain text can be presented throughout the document as the portions (e.g., words) appear as generated the OCR mechanism. The uncertain text can be presented as an index with the page of the document where the uncertain text can be seen in context of the surrounding non-image text, and/or an active link can be provided in the index to take the user to the section of the document with the uncertain text. The uncertain text can also be presented to the user in the form of a short story where a selected portion of non-image text before and/or after the word is presented with the uncertain text to provide context to the user. In this arrangement, the uncertain text and surrounding text portion selected from the document can be placed adjacent to one another akin to a short story of uncertain words. These arrangements of the image segments make it easy for the user to enter corrections, and create user-provided non-image text to replace image segments that replaced uncertain non-image text generated by the OCR mechanism. By allowing the user to move quickly from uncertain text to uncertain text, the time needed to correct the entire document is reduced. The uncertain text may also be reordered so that similar portions of uncertain text are presented together, so that the user can see and correct multiple similar portions of uncertain text without needing to navigate the document.

FIG. 5 illustrates an example of a system for replacing non-image text. The system 560 for replacing non-image text can include a network 572. An example of the network 572 can include a cloud computing network. The network 572 can include one or more computing resources 582 networked by various communication channels 580. The system 560 can include an OCR mechanism 512. The OCR mechanism 512 can be comprised of one or more OCR engines. An OCR mechanism, as described herein, can include one or more OCR engine dictionaries. The OCR engines can be used to generated non-image text and provide a confidence score. In an example, the OCR mechanism 512 can be used to provide a non-image text document with the highest degree of confidence that the non-image text matches the image data based on information aggregated from the one or more OCR engines. The system 560 can include an image processing mechanism 574. The image processing mechanism can include, for instance scanning a document to generate an electronic image of the document, among others.

The system 560 for replacing non-image text can include computer-readable medium (CRM) 564 storing a set of computer readable instructions 555 executable by one or more of the processor resources, e.g., 519-1, 519-2, ..., 519-N, for replacing non-image text, as described herein. Computing device 562, having processor resources of 519-1, 519-2, ..., 519-N, can be in communication with, and/or receive a tangible non-transitory computer readable 564. A computing device 562 (e.g., an e-reader device) can include memory 563 coupled with the processor resources, e.g., 519-1, 519-2, ..., 519-N. The memory 563 can include volatile and/or non-volatile memory. The computing device 562, can include and/or receive a tangible non-transitory computer-readable medium 564 storing a set of computer-readable instructions 555 via an input device 526. The computer readable instructions 555 are executed by one or more of the processor resources 519-1, 519-2, ..., 519-N, for replacing non-image text, as described herein. For instance, the computing device can be an e-reader device. The computing device 562 can include a user interface. A computing resource 582 can include control circuitry such as a processor, a state machine, application specific integrated circuit (ASIC), controller and/or similar machine. The control circuitry can have a structure that provides a given functionality, and/or execute computer readable instructions 555 that are stored on a non-transitory computer-readable medium 564. The system 560 can include a user interface 516 coupled to the network 572 which can present images and non-image text to a user based on activities performed by the system 560.

In the system 560, the computing device 562 and the network 572 can receive instructions for replacing non-image text according to examples disclosed herein. In an example, the computing can receive an indication that a portion of non-image text is uncertain and receive a request to pad an image to create an image segment. The computing device 562 can receive a request to replace the portion of non-image text with the image segment. The computing device can receive a request to replace the image segment with user-provided non-image text. The computing device 562 can receive a request to promulgate the user-provided non-image text to a number of additional users. In an example, the network 572 can receive an indication that a portion of non-image text is uncertain and receive a request to pad an image to create an image segment. The network 572 can receive a request to promulgate the user-provided non-image text to a number of additional users.

Processor resources can execute computer-readable instructions 555 that are stored on an internal or external non-transitory computer-readable medium 564. A non-transitory computer-readable medium (e.g., computer readable medium 564), as used herein, can include volatile and/or non-volatile memory. Volatile memory can include memory that depends upon power to store information, such as various types of dynamic random access memory (DRAM), among others. Non-volatile memory can include memory that does not depend upon power to store information. Examples of non-volatile memory can include solid state media such as flash memory, EEPROM, phase change random access memory (PCRAM), magnetic memory such as a hard disk, tape drives, floppy disk, and/or tape memory, optical discs, digital video discs (DVD), high definition digital versatile discs (HD DVD), compact discs (CD), and/or a solid state drive (SSD), flash memory, etc., as well as other types of machine-readable media.

The non-transitory computer-readable 564 medium can be integral, or communicatively coupled, to a computing device, in either in a wired or wireless manner. For example, the non-transitory computer-readable medium can be an internal memory, a portable memory, a portable disk, or a memory located internal to another computing resource (e.g., enabling the computer-readable instructions to be downloaded over the Internet).

The CRM 564 can be in communication with the processor resources, e.g., 519-1, 519-2, ..., 519-N, via a communication path 526. The communication path 526 can be local or remote to a machine associated with the processor resources 519-1, 519-2, ..., 519-N. Examples of a local communication path 526 can include an electronic bus internal to a machine such as a computer where the CRM 564 is one of volatile, non-volatile, fixed, and/or removable storage medium in communication with the processor resources, e.g., 519-1, 519-2, ..., 519-N, via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof.

In other examples, the communication path 526 can be such that the CRM 564 is remote from the processor resources, e.g., 519-1, 519-2, ..., 519-N, such as in the example of a network connection between the CRM 564 and the processor resources, e.g., 519-1, 519-2, ..., 519-N. That is, the communication path 526 can be a network connection. Examples of such a network connection can include a local area network (LAN), a wide area network (WAN), a personal area network (PAN), and the Internet, among others. In such examples, the CRM 564 may be associated with a first computing device and the processor resources, e.g., 519-1, 519-2, ..., 519-N, may be associated with a second computing device 562.

Although specific examples have been illustrated and described herein, those of ordinary skill in the art will appreciate that an arrangement calculated to achieve the same results can be substituted for the specific examples shown. This disclosure is intended to cover adaptations or variations of a number of examples of the present disclosure. It is to be understood that the above description has been made in an illustrative fashion, and not a restrictive one. Combination of the above examples, and other examples not specifically described herein will be apparent to those of skill in the art upon reviewing the above description. The scope of the examples of the present disclosure includes other applications in which the above structures and methods are used. Therefore, the scope of a number of examples of the present disclosure should be determined with reference to the appended claims, along with the full range of equivalents to which such claims are entitled.

Throughout the specification and claims, the meanings identified below do not necessarily limit the terms, but merely provide illustrative examples for the terms. The meaning of "a", "an", and "the" includes plural reference, and the meaning of "in" includes "in" and "on." The phrase "in an example", as used herein does not necessarily refer to the same example, although it may.

What is claimed:

1. A method for replacing generated text, comprising:
    padding a first data representing an image of text in a first document to create an image segment, wherein the first document and the image segment are in a non-textually editable format; and
    replacing a second data representing generated text with the image segment in a second document with a textually editable format.

2. The method of claim 1, further comprising computing a boundary box around the second data.

3. The method of claim 2, further comprising sizing the image segment to match the height and width of the boundary box.

4. The method of claim 2, further comprising sizing the image segment to match the height of the boundary box and sizing the width based on a ratio calculated from the height and width of text within the image segment.

5. The method of claim 1, further comprising marking at least a portion of the image segment to distinguish the image segment from generated text.

6. A non-transitory computer-readable medium for replacing generated text with instructions stored thereon executed by a processor to:
    indicate that a portion of generated text in a first document with a textually editable format is uncertain;

pad an image corresponding to the portion of generated text to create an image segment in a second document, wherein the second document and the image segment are in a non-textually editable format;

replace the portion of generated text in the first document with the image segment; and replace the image segment with user-provided text.

7. The computer-readable medium of claim 6, wherein the instructions include instructions that are executed to replace the image segment with user-provided text includes presenting the image segment and the portion of generated text to a user in an editing field.

8. The computer-readable medium of claim 7, further including instructions that are executed to mark that the image segment was replaced by the user-provided text.

9. The computer-readable medium of claim 7, further including instructions that are executed to store information about the user, the user-provided text, and the image segment.

10. The computer-readable medium of claim 9, further including instructions that are executed to promulgate the stored information with a number of additional users.

11. The computer-readable medium of claim 6, further including instructions that are executed to identify other similar occurrences of the same generated text replaced by the image segment.

12. The computer-readable medium of claim 11, further including instructions that are executed to replace a number of the other similar occurrences of the same generated text with the user-provided non-image text.

13. The computer-readable medium of claim 6, further including instructions that are executed to:

identify when the portion of generated text includes two or more adjacent words; and pad the portion of the image associated with each of the two or more adjacent words to create an image segment for each of the two or more adjacent words.

14. A system for replacing generated text comprising:

processor resources;

memory resources coupled to the processor resources, the memory resources having instructions executed by the processor resources to:

receive an indication that a portion of generated text in a first document with a textually editable format is uncertain;

receive an image segment that has been padded from a second document, wherein the image segment and the second document are in a non-textually editable format;

cause the portion of generated text in the first document to be replaced with the image segment;

receive a request to replace the image segment with user-provided text; and receive a request to promulgate the user-provided text to a number of additional users.

15. The system of claim 14, further including instructions that are executed to cause a credibility score to be assigned to the user-provided text.

* * * * *